United States Patent [19]

Lee

[11] Patent Number: 4,523,770

[45] Date of Patent: Jun. 18, 1985

[54] ROLLER BICYCLE

[76] Inventor: Bang W. Lee, 302-86, Echon-Dong, Yongsan-Ku, Seoul, Rep. of Korea

[21] Appl. No.: 475,115

[22] Filed: Mar. 14, 1983

[30] Foreign Application Priority Data

May 31, 1982 [KR] Rep. of Korea ............... 2472/1982

[51] Int. Cl.³ .............................................. B62K 5/04
[52] U.S. Cl. .................................... 280/266; 280/282
[58] Field of Search ......... 280/267, 266, 282, 87.04 A

[56] References Cited

U.S. PATENT DOCUMENTS

| 4,093,252 | 6/1978 | Rue | 280/87.04 A |
| 4,132,435 | 1/1979 | Wilson | 280/282 |
| 4,417,743 | 11/1983 | Garel | 280/266 |

Primary Examiner—John A. Pekar
Attorney, Agent, or Firm—Price, Heneveld, Huizenga & Cooper

[57] ABSTRACT

This invention relates to a roller bicycle having rollers rotably mounted on the front wheel shaft and a single rear wheel for a common use as a sporting and playing apparatus on which one can ride forward and backward by keeping his balance, thereby improving his agility and developing his physical strength.

2 Claims, 3 Drawing Figures

ROLLER BICYCLE

BACKGROUND OF THE INVENTION

In the past, there have been many types of unicycles and bicycles for such purposes, but they all have been used for performing stunts (e.g. at the circus shows) or limited only to special use. Consequently, the prior unicycles could not have been used as usual sporting and playing apparatus like bicycles, and when children and unskilled adults ride on the prior unicycles, they must be always ready to risk accidents. Accordingly, the prior unicycles and the like are not suitable for the playing and sporting apparatus in view of the physical training and the entertainment purposes.

SUMMARY OF THE INVENTION

The object of the present invention is to provide a novel roller bicycle which eliminates the aforementioned disadvantages of the prior art and minimizes the danger of accidents, so that every one can, without distinction of age or sex, make use of said roller bicycle not only for enjoying games and plays but also for taking physical exercises, thereby developing his own autonomic nerve system and building up the muscles of the body and further contributing to the improvement of the strength, suppleness, balance, and health of the body to keep the body in well-proportioned figure especially for women.

In order to attain the desired objects, said roller bicycle of the present invention has been designed and completed after a long sustained studies and experiments.

DRAWINGS

DESCRIPTION OF THE INVENTION

Figure 1:
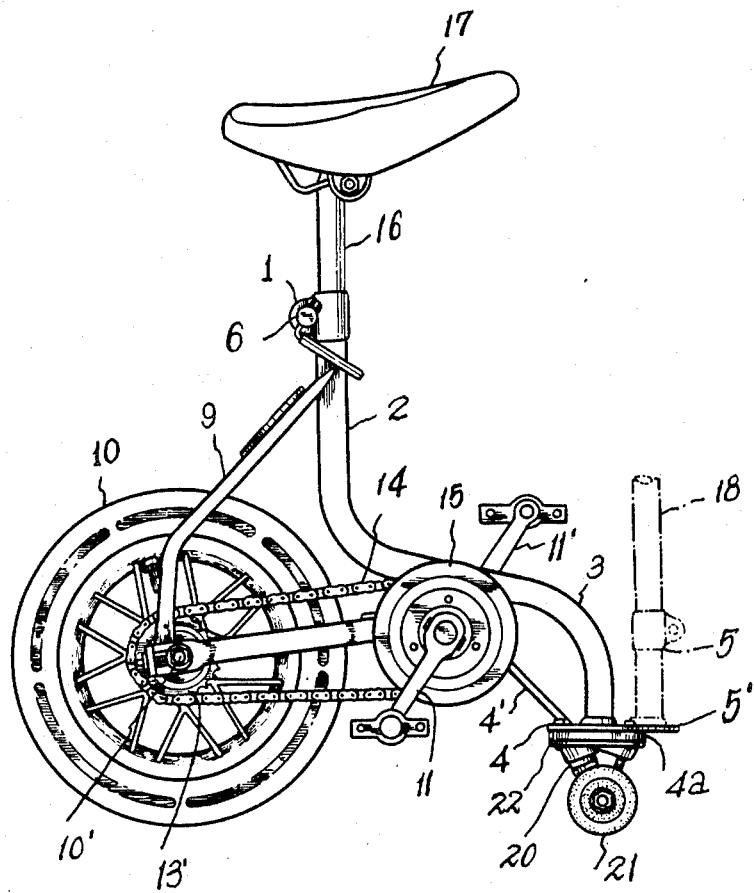
FIG. 1 is a side elevational view of a preferred embodiment in accordance with present invention.

According to the present invention, said roller bicycle comprises:

a support frame tube integrally forming the upper support tube 2 and the lower support tube 3, said upper support tube 2 having a saddle adjusting device 1 and an adjusting clamp lever 6 both provided on the top of said upper support tube 2;

a pair of horizontal frame forks 8 & 8' the front head of which is rigidly connected to the pedal shaft tube 7 and both rear ends of which support the rear wheel shaft 10' therebetween;

a single rear wheel 10 mounted on the rear wheel shaft 10';

a pair of rear frame forks 9 & 9' supporting said upper support tube 2 and said rear wheel shaft 10';

a pair of pedal levers 11 & 11' securely connected to the pedal shaft 12;

a sprocket wheel 13 securely mounted on said pedal shaft 12, and a chain wheel 13' securely mounted on said rear wheel shaft 10', both sprocket wheel 13 and chain wheel 13' being co-operated by a driving chain 14;

a front roller base 4 rigidly mounted on the lower end of said lower support tube 3 and at the same time attached to a support rod 4', the other end of said support rod 4' being connected to said pedal shaft tube 7;

a pair of rollers 21 & 21' rotably mounted on the roller shaft 19, and a roller mounting plate 22 having resilient support axes 20 & 20' which are securely mounted on said roller shaft 19; and a shock absorbing block 4a to be inserted between said front roller base 4 and said roller mounting plate 22, wherein said front roller base 4, said shock absorbing block 4a, and said roller mounting plate 22 are securely fastened together by means of bolts and nuts.

Figure 2:
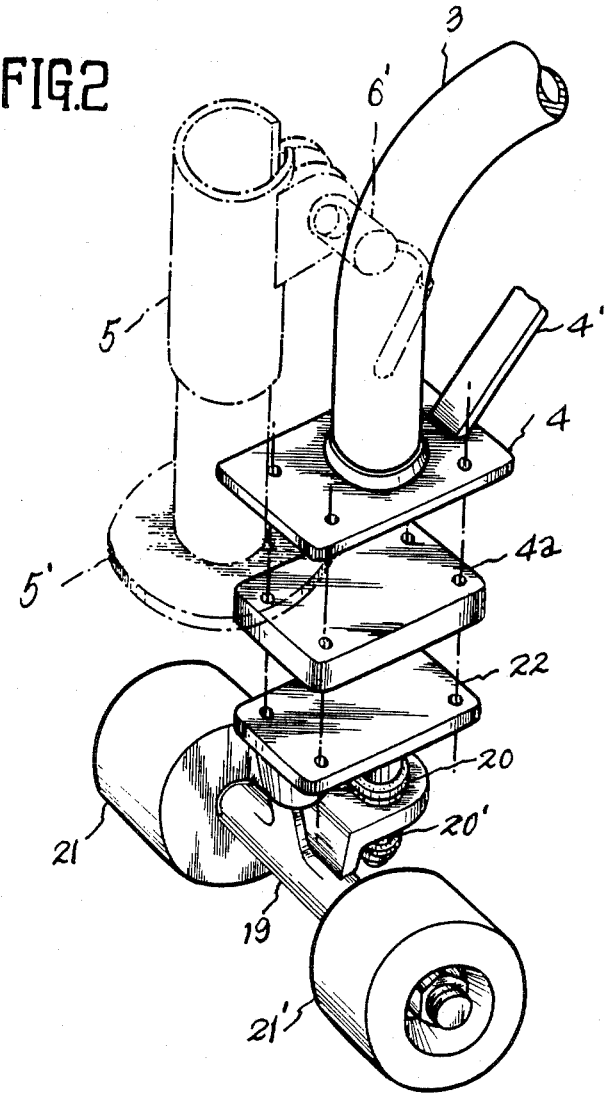
FIG. 2 is an exploded perspective view of the rollers mounted on the front wheel shaft of FIG. 1.
Figure 3:
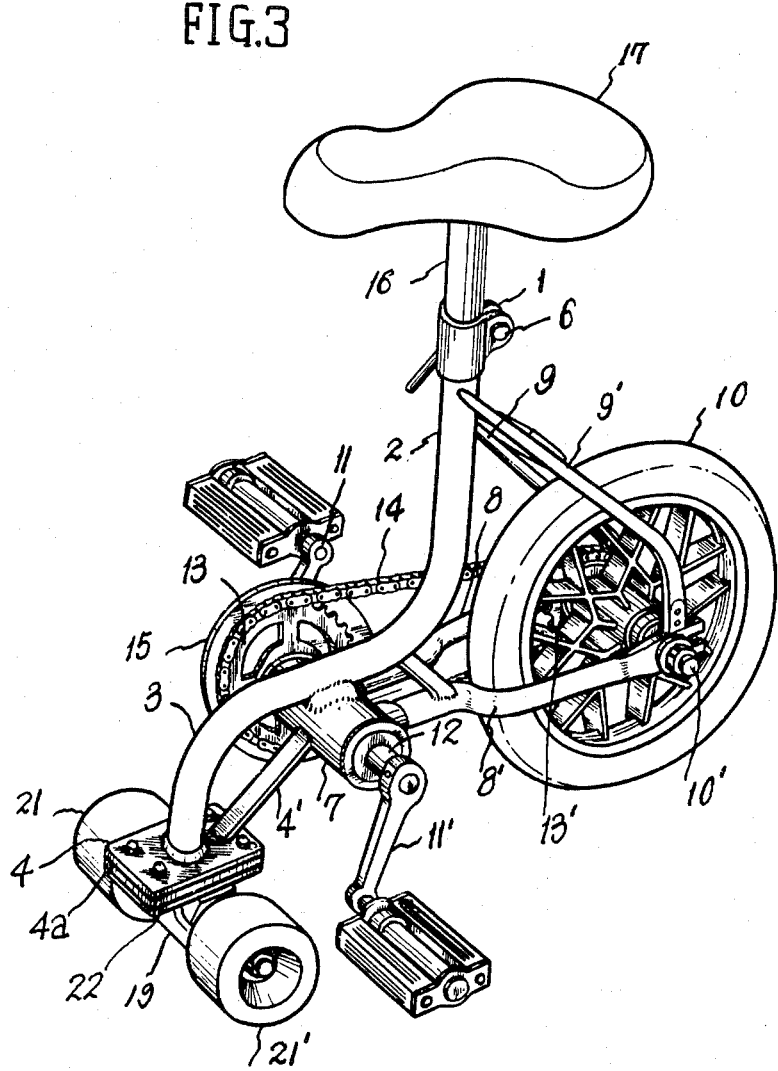
FIG. 3 is an overall perspective view of the roller bicycle of the present invention.

As illustrated by dot-dash-lines in FIGS. 1 & 2, said front roller base 4 may be extended forwardly to form a projecting support plate 5' on which a front support tube 5 will be vertically mounted, whereby a grip bar 18 can be inserted into said front support tube 5 and the height of said grip bar 18 can be adjusted by means of a adjusting clamp lever 6' so that unskilled beginners can use said grip bar 18 for mounting and riding on said saddle 17.

While unskilled beginners may require said grip bar 18 and said adjusting clamp lever 6', skilled people will not need them. Therefore, in view of the production cost and the manufacturing process, it may be also recommendable to omit said projecting support plate 5'.

When a beginner uses said roller bicycle of the present invention, he will first loosen the adjusting clamp lever 6 and adjust the height of the saddle 17 to his height and to the length of his legs (if the grip bar 18 is available, its height will be adjusted by means of the adjusting clamp lever 6'.), and after fastening the clamp lever 6 or 6', he can mount on the saddle 17 by gripping it at the end thereof with one hand. While riding on the roller bicycle by actuating said pedals, the rider must keep his balance on said roller bicycle continuously. Otherwise, said single rear wheel 10 and said rollers 21 & 21' are very apt to fall due to the unstable effect of said resilient support axes 20 & 20'. However, after becoming skilled very soon, one can ride skillfully forward and backwards by distributing his weight evenly and change directions by shifting his weight to the right and left.

Unlike the usual bicycles, one must keep his balance continuously while riding on the roller bicycle of the present invention so as not to fall. Furthermore, one must step on the ground with both feet at the moment of falling to prevent himself from falling, and when stopping said roller bicycle, one should also brake it by stepping on the gound. In other words, said roller bicycle doesn't need any additional brake means.

When playing games on opposite sides, players can play discus throwing and catch ball, etc. while riding on their roller bicycles, and if one is skilled in riding on the roller bicycle, he can enjoy taking many kinds of sports by himself.

Therefore, riding on the roller bicycle will contribute not only to the whole body exercise, the development of the autonomic nerve system, the building-up of the muscles, and the wearing-off of the surplus fat of the body but also to the maintaining of the body in well-proportioned figure especially for women.

Furthermore, the roller bicycle of the present invention has the advantages of the simple construction for the manufacturing process and the low production cost for the popularization of the products.

What I claim is:

1. A roller bicycle having a primary frame member, said primary frame member having a vertical upper portion, a vertical lower portion and a rearwardly and upwardly inclined central portion connected to said upper and lower portions by curvilinear transition sections all formed as a single unitary element; a pedal shaft tube rigidly mounted to and beneath said central portion and pedal means rotatably mounted on said tube, a bifurcated rear frame member extending generally horizontally from said pedal shaft tube; a single rear wheel within the rear bifurcated portion of said rear frame member and an axle rotatably securing said rear wheel to the rear ends of said rear frame member; means on the ends of said rear frame members for adjusting the position of said axle and wheel lengthwise of said frame member; means interconnecting said rear wheel and pedal means; a seat and means securing said seat for vertical adjustment to and above the top end of said upper primary frame portion; a base plate rigidly secured to the bottom end of said lower portion of said primary frame; a roller plate and a shock absorbing plate mounted between said base and roller plate and means interconnecting said base, shock absorbing and roller plates in laminar fashion; a pair of laterally spaced rollers at the front end of said bicycle, said rollers being of substantially smaller diameter than said rear wheel and a shaft and shaft housing means mounting said rollers for free rotation, resilient support elements connecting said shaft housing to said roller plate whereby limited lateral tilting of said primary frame with respect to the shaft housing and shaft can occur; said seat being substantially midway between said rear wheel and said front rollers and between said rear wheel and said pedal shaft tube.

2. A roller bicycle having a primary frame member, said primary frame member having a vertical upper portion, a vertical lower portion and a rearwardly and upwardly inclined central portion connected to said upper and lower portions by curvilinear transition sections all formed as a single unitary element; a pedal shaft tube rigidly mounted to and beneath said central portion and pedal means rotatably mounted on said tube, a bifurcated rear frame member extending generally horizontally from said pedal shaft tube; a single rear wheel within the rear bifucated portion of said rear frame member and an axle rotatably securing said rear wheel to the rear ends of said rear frame member; means interconnecting said rear wheel and pedal means; a seat and means securing said seat to and above the top end of said upper primary frame portion; a plate-like base element secured to the bottom end of said lower portion of said primary frame; a pair of laterally spaced rollers at the front end of said bicycle, said rollers being of substantially smaller diameter than said rear wheel and a shaft and shaft housing means mounting said rollers for free rotation, resilient support elements connecting said shaft housing to said base element whereby limited lateral tilting of said primary frame with respect to the shaft housing and shaft can occur; said seat being substantially midway between said rear wheel and said front rollers and between said rear wheel and said pedal shaft tube.

* * * * *